(12) United States Patent
Tokikura et al.

(10) Patent No.: US 8,644,553 B2
(45) Date of Patent: Feb. 4, 2014

(54) IMAGE DISPLAY DEVICE, IMAGE DISPLAY METHOD, AND IMAGE DISPLAY PROGRAM

(75) Inventors: Munehiro Tokikura, Kanagawa-ken (JP); Hiroyuki Aizu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 323 days.

(21) Appl. No.: 13/016,359

(22) Filed: Jan. 28, 2011

(65) Prior Publication Data

US 2011/0249862 A1 Oct. 13, 2011

(30) Foreign Application Priority Data

Apr. 9, 2010 (JP) ................................. 2010-090506

(51) Int. Cl.
*G06K 9/00* (2006.01)
(52) U.S. Cl.
USPC .......................................................... 382/103
(58) Field of Classification Search
USPC .......................................... 382/103, 284, 294
See application file for complete search history.

(56) References Cited

U.S. PATENT DOCUMENTS

| | | | |
|---|---|---|---|
| 5,434,927 A * | 7/1995 | Brady et al. .................. | 382/104 |
| 6,724,915 B1 * | 4/2004 | Toklu et al. .................. | 382/103 |
| 7,463,754 B2 * | 12/2008 | Yang et al. ................... | 382/103 |
| 8,045,757 B2 * | 10/2011 | Tsunashima .................. | 382/103 |
| 2009/0046897 A1 * | 2/2009 | Rowsell et al. ............... | 382/107 |
| 2009/0295926 A1 * | 12/2009 | Miyazaki ...................... | 348/169 |
| 2011/0231016 A1 * | 9/2011 | Goulding ...................... | 700/246 |

FOREIGN PATENT DOCUMENTS

| | | |
|---|---|---|
| JP | 11-328433 | 11/1999 |
| JP | 2001-195582 | 7/2001 |
| JP | 2004282368 A | * 10/2004 |
| JP | 2006-42229 | 2/2006 |
| JP | 2007-318321 | 12/2007 |
| JP | 2009-193135 | 8/2009 |

OTHER PUBLICATIONS

Machine translation of JP 2004-282368 [on-line], retrieved Jan. 29, 2013. Retrieved from the Internet: http://www4.ipdl.inpit.go.jp/Tokujitu/PAJdetail.ipdl?N0000=60&N0120=01&N2001=2&N3001=2004-282368.*
Japanese Office Action issued May 29, 2012, in Japan Patent Application 2010-090506 (with English translation).
Office Action issued Feb. 28, 2012, in Japanese Patent Application No. 2010-090506 with Partial English translation.

* cited by examiner

*Primary Examiner* — Matthew Bella
*Assistant Examiner* — Dennis Rosario
(74) *Attorney, Agent, or Firm* — Oblon, Spivak, McClelland, Maier & Neustadt, L.L.P.

(57) ABSTRACT

According to one embodiment, an image display device that displays acquired image frames includes: an image processing unit that detects a location of a target in a first image frame among the image frames and generates a first predicted location of the target in a second image frame acquired at a first time when a predetermined number of frames or predetermined period of time has passed since the first image frame is acquired; a script processing unit that generates at least one tracking image that starts from the location of the target in the first image frame and heads toward the first predicted location in the second image frame; a synthesis unit that generates combined images where the at least one tracking image is put on image frames between the first and second image frame; and a display unit that displays the combined images.

6 Claims, 11 Drawing Sheets

(a) Frame one second before (b) Current frame (c) Predicted frame one second later ☺ : Target

FIG.4

(a) Information storage unit

| Target ID | n frames before | n-1 frames before | ...... | One frame before |
|---|---|---|---|---|
| 001 | (x,y) Area S Template C | (x',y') Area S' Template C' | ...... | (x~,y~) Area S' Template C' |
| 002 | (p,q) ...... ...... | (p',q') ...... ...... | ...... | (p~,q~) ...... ...... |
| ...... | ...... | ...... | ...... | ...... |

(b) Prediction parameter storage unit

| Target ID | Predicte location T seconds later | Motion pattern | Timeout value | ...... |
|---|---|---|---|---|
| 001 | (x+a1, Y+b1) | f(x,y) | 0 | ...... |
| 002 | (p+a2, q+b2) | g(p,q) | 0 | ...... |
| ...... | ...... | ...... | ...... | ...... |

IMAGE DISPLAY DEVICE, IMAGE DISPLAY METHOD, AND IMAGE DISPLAY PROGRAM

CROSS-REFERENCE TO RELATED APPLICATION

This application is based upon and claims the benefit of priority from the prior Japanese Patent Application No. 2010-090506 filed on Apr. 9, 2010, the entire contents of which are incorporated herein by reference.

FIELD

Embodiments described herein relate generally to an image display device, an image display method and an image display program.

BACKGROUND

There has been an image display device that adopts an object-tracking technique that uses moving images working together with graphics. The object-tracking technique is a technique of detecting the location of an object on a moving image and the like when the object on the moving image is tracked, generating for example a tracking image in the shape of a rectangle at the detected location, and displaying the moving and tracking images that are superimposed on each other. It is known that the object-tracking technique is for example applied to a vehicle detection technique. The vehicle detection technique is a technique of detecting a vehicle with the use of an on-vehicle camera and drawing a figure showing a result of the tracking of the vehicle.

However, it is after an image processing unit detects the location of the object and the like for each frame of the moving image that a drawing unit draws the tracking image on the basis of a result of the detection. Therefore, the number of times the image processing unit notifies the drawing unit of the result of the object detection increases, putting more burden on the image display device. It is possible to reduce burden on the image display device by detecting the location of the object and the like after a process of thinning out the frames and then drawing the tracking image on the basis of the result of the detection. In this case, however, the problem is that the tracking images are not seamlessly displayed but are spaced out when being displayed.

BRIEF DESCRIPTION OF THE DRAWINGS

FIGS. 4A and 4B are diagrams showing parameters stored in the storage unit 1023 according to the present embodiment;

DETAILED DESCRIPTION

According to one embodiment, an image display device that displays acquired image frames includes: an image processing unit that detects a location of a target in a first image frame among the image frames and generates a first predicted location of the target in a second image frame acquired at a first time when a predetermined number of frames or predetermined period of time has passed since the first image frame is acquired; a script processing unit that generates at least one tracking image that starts from the location of the target in the first image frame and heads toward the first predicted location in the second image frame; a synthesis unit that generates combined images where the at least one tracking image is put on image frames between the first and the second image frame; and a display unit that displays the combined images.

Hereinafter, an embodiment of the present invention will be described with reference to the accompanying drawings. Incidentally, in each diagram, the same portions are indicated by the same reference symbols and not described repeatedly.

Figure 1:
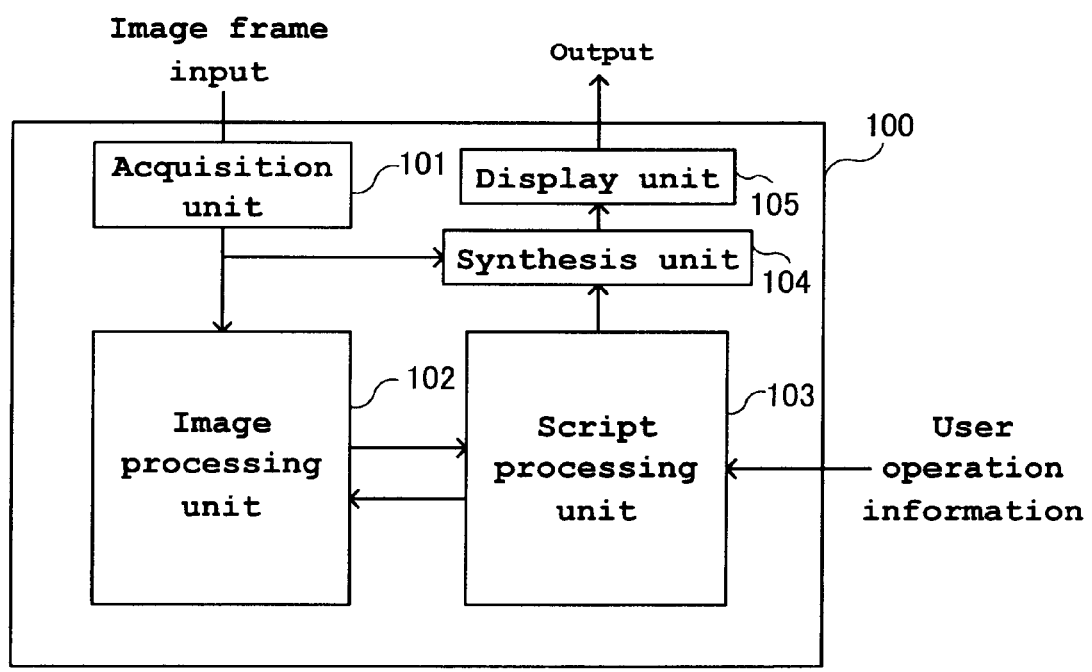
FIG. 1 is a block diagram showing the configuration of an image display device 100 according to an embodiment of the present invention.

FIG. 1 is a block diagram showing the configuration of an image display device 100 according to the embodiment of the present invention. As shown in FIG. 1, the image display device 100 includes an acquisition unit 101, which acquires an image frame, an image processing unit 102, a script processing unit 103, a synthesis unit 104, and a display unit 105. The image processing unit 102 detects a desired target (which is for example a target that is to be tracked, or the like) in a first image frame acquired and generates a prediction parameter including a predicted location of the target in a second image frame that emerges N frames or T seconds later after the first image frame is acquired. After receiving the prediction parameter generated by the image processing unit 102, user operation information or the like, the script processing unit 103 generates a tracking image that starts from the location (referred to as "starting-point location," hereinafter) of the target in the first image frame and heads toward the predicted location of the target in the second image frame. The synthesis unit 104 combines the tracking image and the image frame to produce a combined image. The display unit 105 displays the combined image generated by the synthesis unit 104.

In this case, the prediction parameter is information containing at least the predicted location where the detected target would be T seconds later. The prediction parameter may further include a target ID or a motion pattern that continues until N frames or T seconds later.

In this case, suppose that the to-be-detected target is a target or area that is identified after, for example, a user of the image display device 100 specifies on a screen of the image display device 100 with the use of a remote control or mouse. The to-be-detected target is for example specified with a remote control or mouse on the screen. The to-be-detected target may be determined after the image processing unit 102 automatically specifies a specific portion on the screen, such as an image of a face, in a way that detects the specific portion.

There may be one target or a plurality of targets. Or alternatively, a portion of the target may be used. For example, the to-be-detected target is a face of a person in an image frame.

Figure 2:
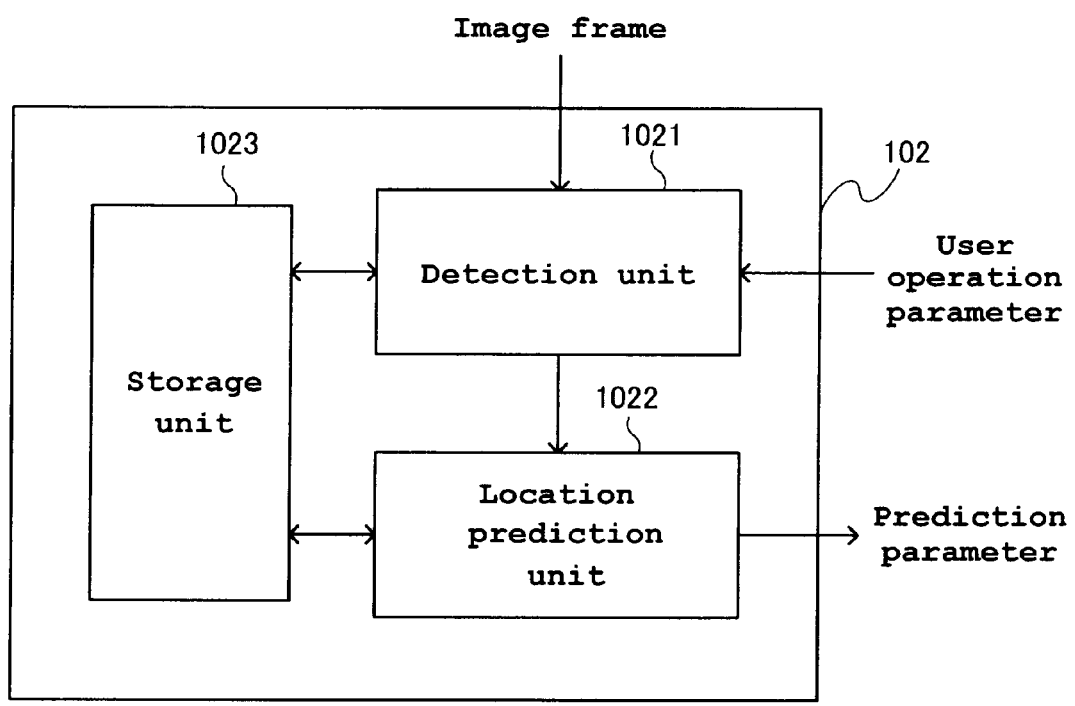
FIG. 2 is a block diagram detailing the configuration of an image processing unit 102 according to the present embodiment.

FIG. 2 is a block diagram detailing the configuration of the image processing unit 102. The image processing unit 102 includes a detection unit 1021, a location prediction unit 1022, and a storage unit 1023.

The detection unit 1021 detects a desired target or portion in an image frame. For example, the detection unit 1021 may detect a desired target or portion in an image frame on the basis of a user operation parameter that is generated after a user specifies with the use of a remote control or mouse. For a method of detecting a target at the detection unit 1021, an image processing method that uses a well-known technique, such as a face image recognition, inter-frame differencing or background differencing technique, can be applied and therefore will not be described here in detail.

The location prediction unit 1022 calculates a prediction parameter such as the location where the detected target or portion would exist N frames or T seconds later. The storage unit 1023 stores information about the target being detected and the prediction parameter, and the like.

The image processing unit 102 may be equipped with a counter, which is not shown in the diagrams. In this case, the counter is provided to end the drawing of the tracking image of the image display device 100 after a desired target has not been detected continuously from image frames for a predetermined period of time or across a predetermined number of successive frames. The counter adds 1 to a counter value when the desired target is not detected in an image frame. When the target is detected, the counter resets the counter value to 0. A threshold value is set in the counter. When the counter value exceeds the threshold value, the image display device 100 ends the drawing of the tracking image.

Figure 3:
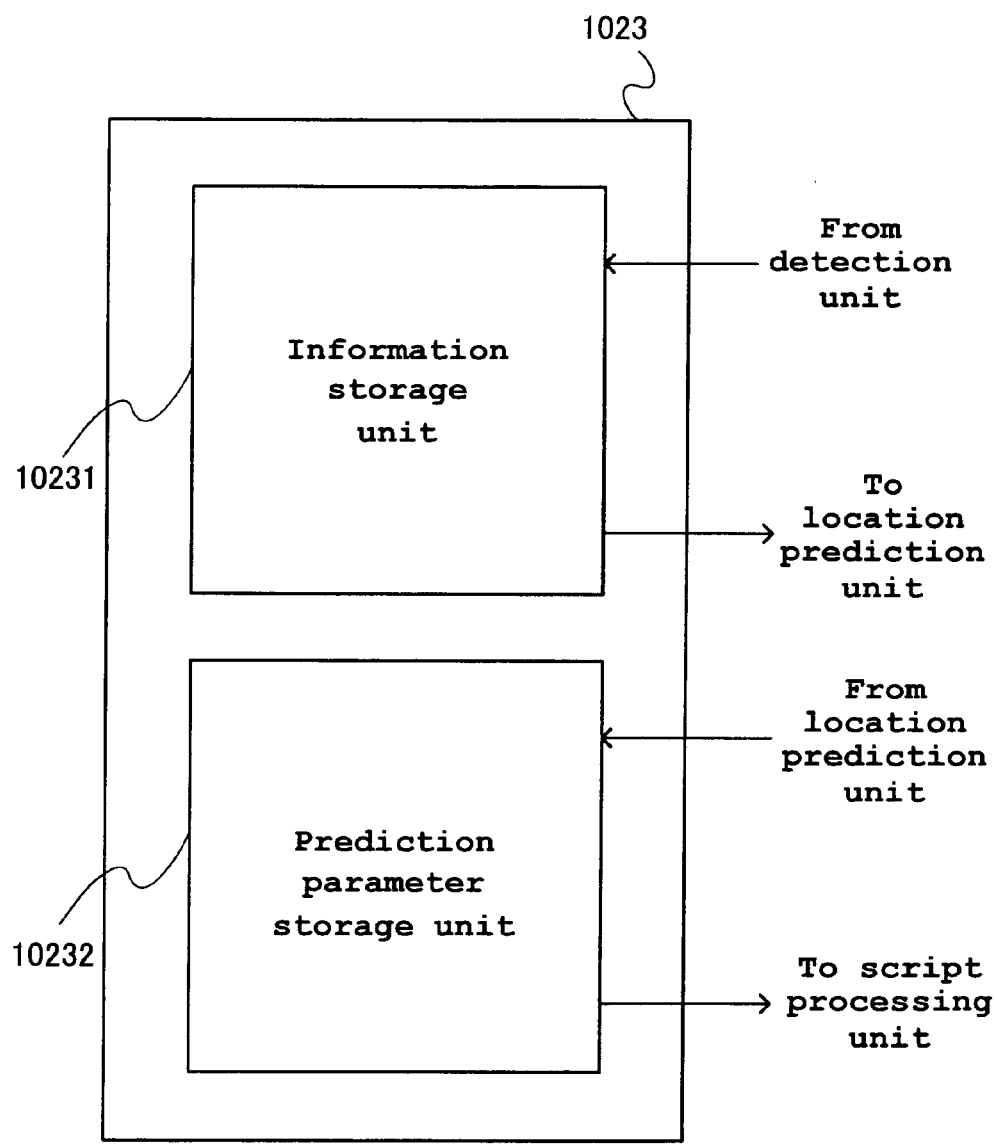
FIG. 3 is a block diagram detailing the configuration of a storage unit 1023 according to the present embodiment.

FIG. 3 is a block diagram detailing the configuration of the storage unit 1023. The storage unit 1023 includes an information storage unit 10231 and a prediction parameter storage unit 10232. The information storage unit 10231 stores attribute information of the target detected by the detection unit 1021. The location prediction unit 1022 calculates prediction parameters from the attribute information of the target that is stored in the information storage unit 10231. The prediction parameter storage unit 10232 stores the prediction parameters predicted by the location prediction unit 1022.

FIGS. 4A and 4B are diagrams showing parameters stored in the storage unit 1023. The attribute information of the target stored in the information storage unit 10231 includes a target ID, which is used to distinguish the target from another target; location coordinates of a target, which is detected in an image; template information (color information, shape information or the like); area S; and the like. The attribute information of the target is calculated and stored each time the image display device 100 receives an image frame. As shown in FIGS. 4A and 4B, the attribute information of the target stored ranges from the one for the image frame that appears n frames before the acquisition of the image frame at the starting-point location to the one for the image frame that appears one frame before the acquisition.

The prediction parameters stored in the prediction parameter storage unit 10232 include a target ID, a predicted location where a target would be N frames or T seconds later, and a motion pattern that continues until N frames or T seconds later. Incidentally, the prediction parameters may include a timeout value, which is a counter value.

In this case, when there is a plurality of targets on the screen, the target ID is made possible to be identified. The predicted location on the screen where the target would be N frames or T seconds later is the location coordinates that are predicted at the time of acquiring the image frame at the starting-point location for the target T seconds or N frames later. The motion pattern is a pattern representing what route the target takes moving from the starting-point location to reach the predicted location N frames or T seconds later. For example, the motion pattern is a function or the like that represents a straight or curved line connecting the starting-point location to the predicted location that is T seconds or N frames later.

Figure 5:
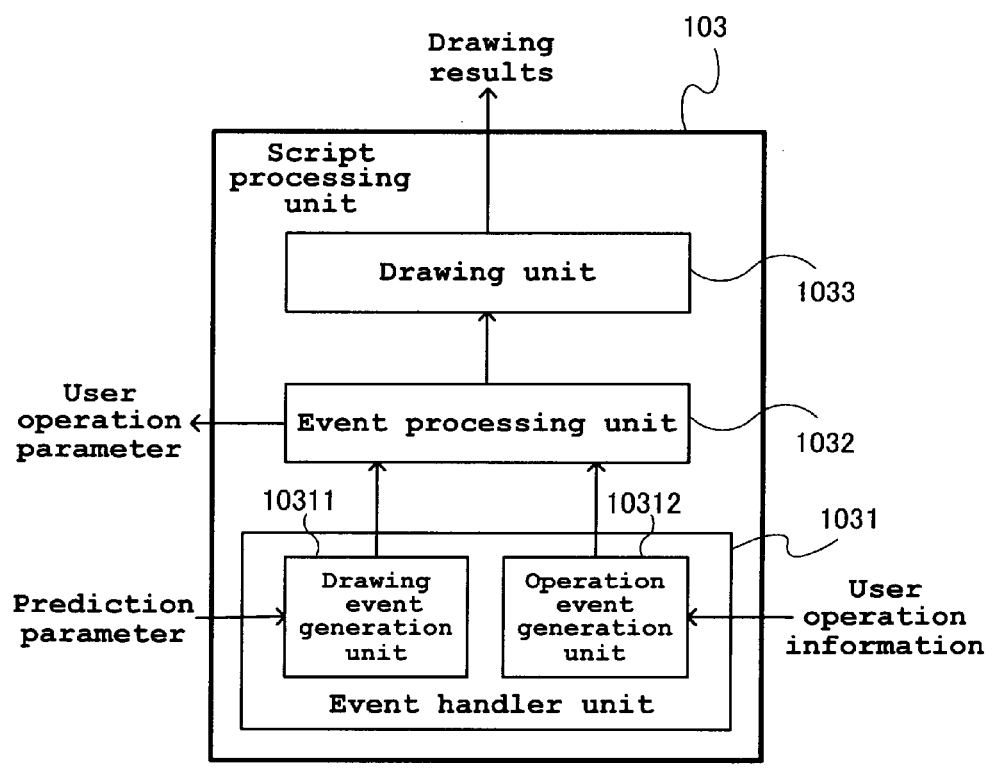
FIG. 5 is a block diagram detailing the configuration of a script processing unit 103 according to the present embodiment.

FIG. 5 is a block diagram detailing the configuration of the script processing unit 103. The script processing unit 103 includes an event handler unit 1031, which accepts various kinds of input and events before generating corresponding events; an event processing unit 1032, which processes an event generated by the event handler unit 1031; and a drawing unit 1033, which draws a result of the event processing by the event processing unit 1032.

The event handler unit 1031 includes a drawing event generation unit 10311 and an operation event generation unit 10312. The event handler unit 1031 generates an event from the prediction parameters or the user operation information.

The drawing event generation unit 10311 generates a drawing event on the basis of the prediction parameters. The event processing unit 1032 performs an event process on the drawing event. The drawing unit 1033 performs a drawing process in accordance with the result of the process by the event processing unit 1032. The operation event generation unit 10312 generates an operation event from the user operation information. The event processing unit 1032 performs an event process on the operation event. The result of the process by the event processing unit 1032 may be used by the detection unit 1021 as user operation parameters.

The user operation information that the event handler unit 1031 receives is, for example, a target detection command, a tracking completion command or the like. In response to a user operation parameter associated with the target detection command, the image processing unit 102 (the detection unit 1021) starts detecting a target. In response to a user operation parameter associated with the tracking completion command, the image processing unit 102 (the detection unit 1021) stops detecting the target.

The target detection command is a command that calls for the starting of the process of detecting a target and generating a tracking image. The target detection command is a command that contains an arrival timing of a prediction parameter (N frames or T seconds), a detection method, and a drawing figure of a tracking image. For example, when the arrival timing of the prediction parameter is T seconds, the image processing unit 102 calculates the prediction parameter every T seconds; the script processing unit 103 receives the prediction parameter every T seconds. The detection method may involve specifying an area by manually operating a mouse, remote control or the like, detecting a face image, detecting a building, or the like. The drawing figure of the tracking image is information about what figure is used in drawing the tracking image.

Figure 6:
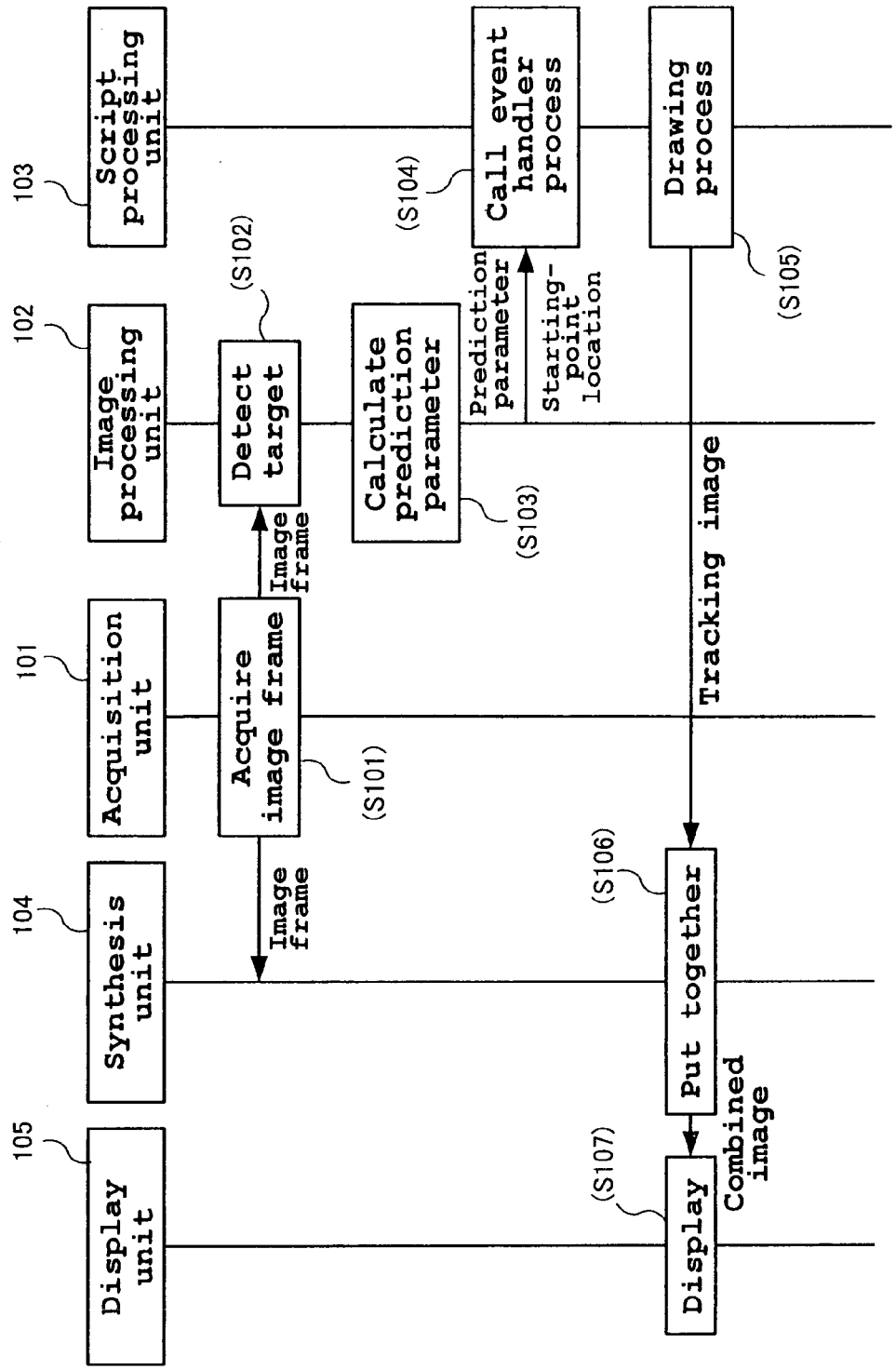
FIG. 6 is a sequence chart illustrating an operation of the image display device 100 according to the present embodiment.

The following describes an operation of the image display device 100 having the above configuration. FIG. 6 is a sequence chart illustrating an operation of the image display device 100 according to an embodiment of the present invention.

First, the acquisition unit 101 of the image display device 100 acquires an image frame (S101). The image processing unit 102 detects a desired target from the acquired image frame (S102).

After detecting the target, the image processing unit 102 calculates a prediction parameter (referred to as "first prediction parameter," hereinafter) containing a predicted location (referred to as "first predicted location," hereinafter) which the detected target is expected to reach from the current location on the screen N frames or T seconds later (S103). The image frame that the image processing unit 102 uses to calculate the first prediction parameter is referred to as "first image frame." The time at which T seconds have passed since the first image frame is referred to as "first time." The image frame that is acquired at the first time is referred to as "second image frame."

On the basis of the calculated first prediction parameter and the location (starting-point location) of the target detected in the first image frame, the event handler unit 1031 in the script processing unit 103 generates a drawing event; the event processing unit 1032 performs an event process on the drawing event (S104). On the basis of the result of the event process on the drawing event by the event processing unit 1032, the drawing unit 1033 draws a tracking image (in the shape of a rectangle or the like, for example) on the screen that continues until N frames or T seconds later in such a way that the tracking image continuously moves in accordance with the first prediction parameter (S105). More specifically, the script processing unit 103 generates the tracking image that starts from the starting-point location of the first image frame and heads toward the first predicted location of the second image frame. If the first prediction parameter includes only the first predicted location, the script processing unit 103 draws the tracking image that linearly moves from the starting-point location of the first image frame to the first predicted location of the second image frame. If the first prediction parameter further includes a motion pattern indicating how the target moves from the starting-point location of the first image frame to the first predicted location of the second image frame, the script processing unit 103 draws the tracking image that moves in accordance with the motion pattern from the starting-point location of the first image frame to the first predicted location of the second image frame. At this time, the script processing unit 103 may generate a tracking image for each image frame. The script processing unit 103 may work at different timings from the image processing unit 102. The tracking image may be generated at a frame generation timing of the script processing unit 103.

The synthesis unit 104 puts the tracking image on the acquired image frame to generate a combined image (S106). The generated combined image is transmitted to the display unit 105, which then displays the combined image (S107).

As described above, the script processing unit 103 can draw without depending on the location of the target detected by the image processing unit 102 until a period of N frames or T seconds has passed since the first image frame is acquired. Therefore, it is possible to reduce the number of times a notification is issued from the image processing unit 102 to the script processing unit 103 and therefore to reduce burden on the image display device 100. Moreover, it is possible for the script processing unit 103 to draw for every frame during the period of N frames or T seconds in accordance with the prediction parameter, making continuous drawing possible. Thus, the script processing unit 103 can draw the tracking image smoothly.

Figure 7:
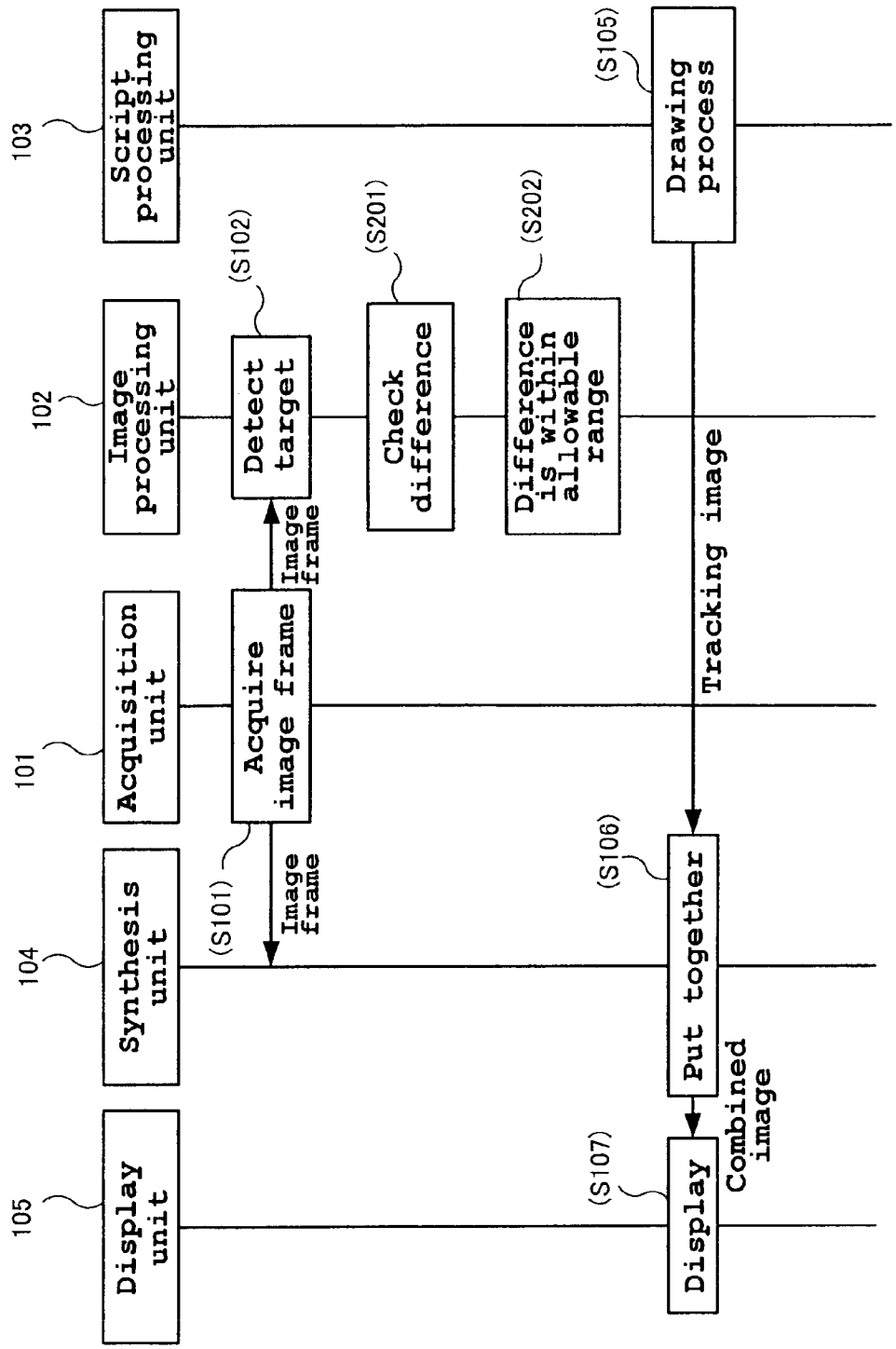
FIG. 7 is a sequence chart illustrating an operation of the image display device 100 during a drawing process of a script processing unit, according to the present embodiment.
Figure 8:
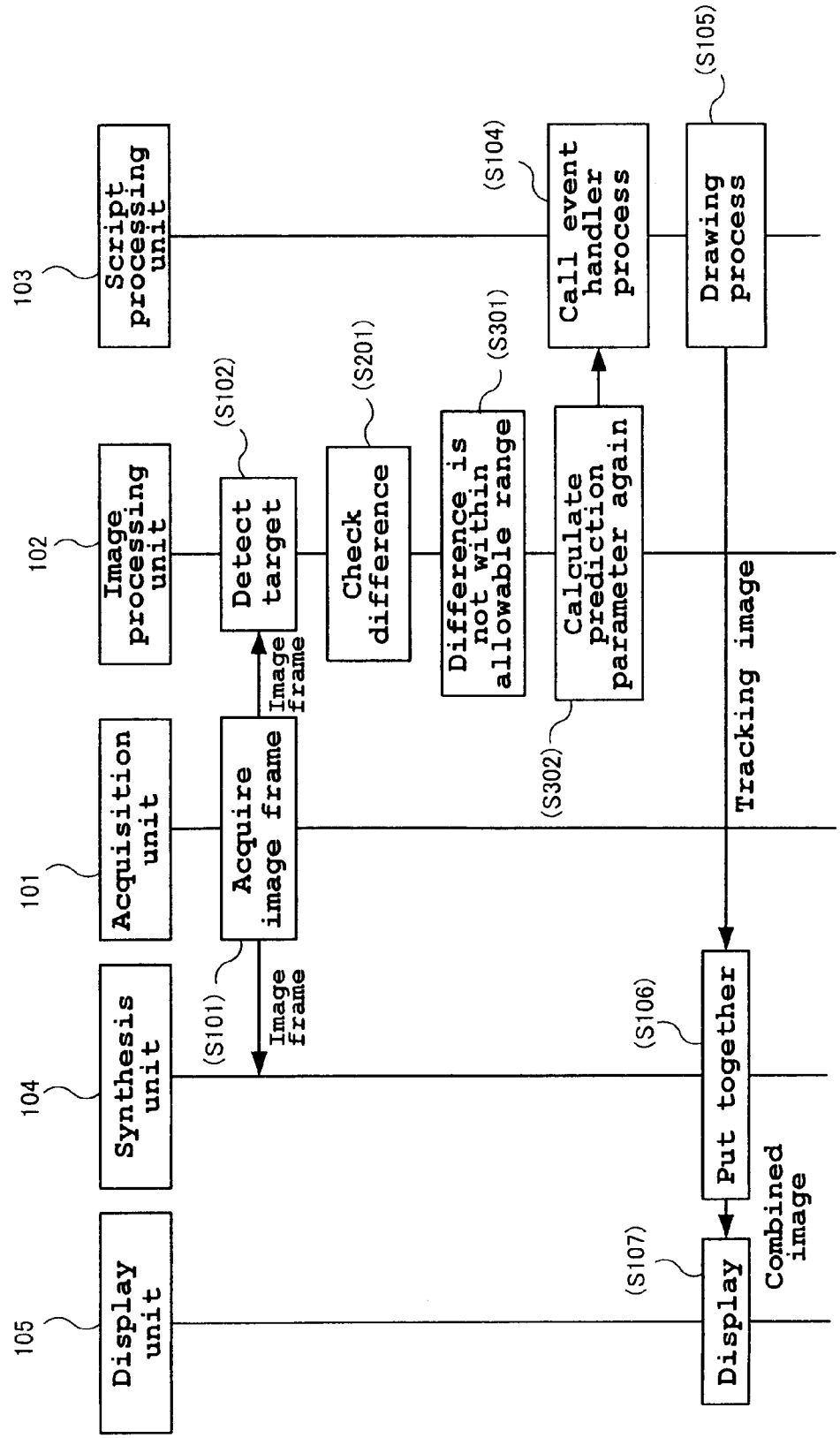
FIG. 8 is a sequence chart illustrating an operation of the image display device 100 when a difference occurs in a prediction parameter, according to the present embodiment.

The following describes an operation of the image display device 100 when the script processing unit 103 draws the tracking image in accordance with the prediction parameter, especially an example of the case where the prediction parameter is changed during the drawing process, with reference to FIGS. 7 and 8.

FIG. 7 is an operational sequence chart for the image display device 100 when the script processing unit 103 is drawing the tracking image, as well as for the case where it is determined as a result of a prediction check that a difference is within an allowable range. FIG. 8 is a sequence chart for the case where it is determined as a result of a prediction check that the prediction difference is not within the allowable range.

In FIGS. 7 and 8, the same operational steps as in FIG. 6 are represented by the same reference symbols and will not be described.

The following describes an operation of the image display device 100 when the script processing unit 103 is drawing the tracking image, with reference to FIG. 7.

When the script processing unit 103 is performing the drawing process on the basis of the prediction parameter, the image display device 100 acquires an image frame (referred to as "third image frame," hereinafter). The image processing unit 102 then detects the target from the third image frame (S102). Based on the result of the detection, the image processing unit 102 checks whether the difference of the prediction parameter is within the allowable range (S201).

In this case, if the current time (referred to as "second time," hereinafter) is represented by t, the method of detecting the difference of the prediction parameter involves the image processing unit 102 calculating a predicted location (referred to as "second predicted location," hereinafter) where the target would exist T-t seconds later. The image processing unit 102 checks the difference between the first predicted location of time T (first time), which is predicted at a previous point in time (time 0), and the second predicted location of time T, which is predicted at the current time t (second time). If the distance between the second predicted location and the first predicted location is greater than a predetermined value, the image processing unit 102 determines that the difference is not within the allowable range. If the distance is less than or equal to the predetermined value, the image processing unit 102 determines that the difference is within the allowable range. Moreover, if the second predicted location is not in an area (which is for example in the shape of a rectangle) of the figure of the tracking image at the first predicted location, the image processing unit 102 may determine that the difference is not within the allowable range.

When the difference is within the allowable range, the image processing unit 102 does not perform anything anymore (S202). Meanwhile, the script processing unit 103 continues the drawing process based on a value of the prediction parameter. Accordingly, the tracking image is drawn without a notification being received from the image processing unit 102.

Incidentally, as for the method of detecting the difference of the prediction parameter, a different method from the above may be used. For example, what may be used is a method of comparing, at time t, the tracking image that the script processing unit 103 is drawing with the target detected at time t and detecting that the difference is not in the allowable range after the location coordinates of the target are not included in the area of the figure of the tracking image that the script processing unit 103 is drawing.

The following describes an operation of the image display device 100 when a determination is made by a prediction check as to a prediction difference, with reference to FIG. 8.

In FIG. 8, the same operational steps as in FIGS. 6 and 7 are represented by the same reference symbols and will not be described.

When it is determined as a result of a prediction check that the prediction difference is not within the allowable range (S301), the image processing unit 102 calculates the prediction parameter again (S302). From the calculated prediction parameter, the event handler unit 1031 in the script processing unit 103 calls a new drawing process (S104) before stopping the ongoing drawing process. The drawing unit 1033 promptly starts the new drawing process (S105). The synthesis unit 104 puts the drawn picture on the image frame to create a combined image (S116). The display unit 105 displays the combined image (S107).

Incidentally, in the case described above, the prediction parameter is calculated again. However, the second predicted location of time T, which is calculated at time t (second time), may be used as a prediction parameter (referred to as "second prediction parameter," hereinafter), which the script processing unit 103 processes.

In order to prevent a difference between the target and the tracking image, the following method may be used: a method of drawing the tracking image, which is drawn by the script processing unit 103, in such a way that the difference is within the allowable range.

Thanks to the above, it is possible to detect the target and generate the tracking image that follows the target. That is, it is possible to reduce the difference between the target and the tracking image.

The following describes in detail a method of calculating the prediction parameter.

Figure 9:
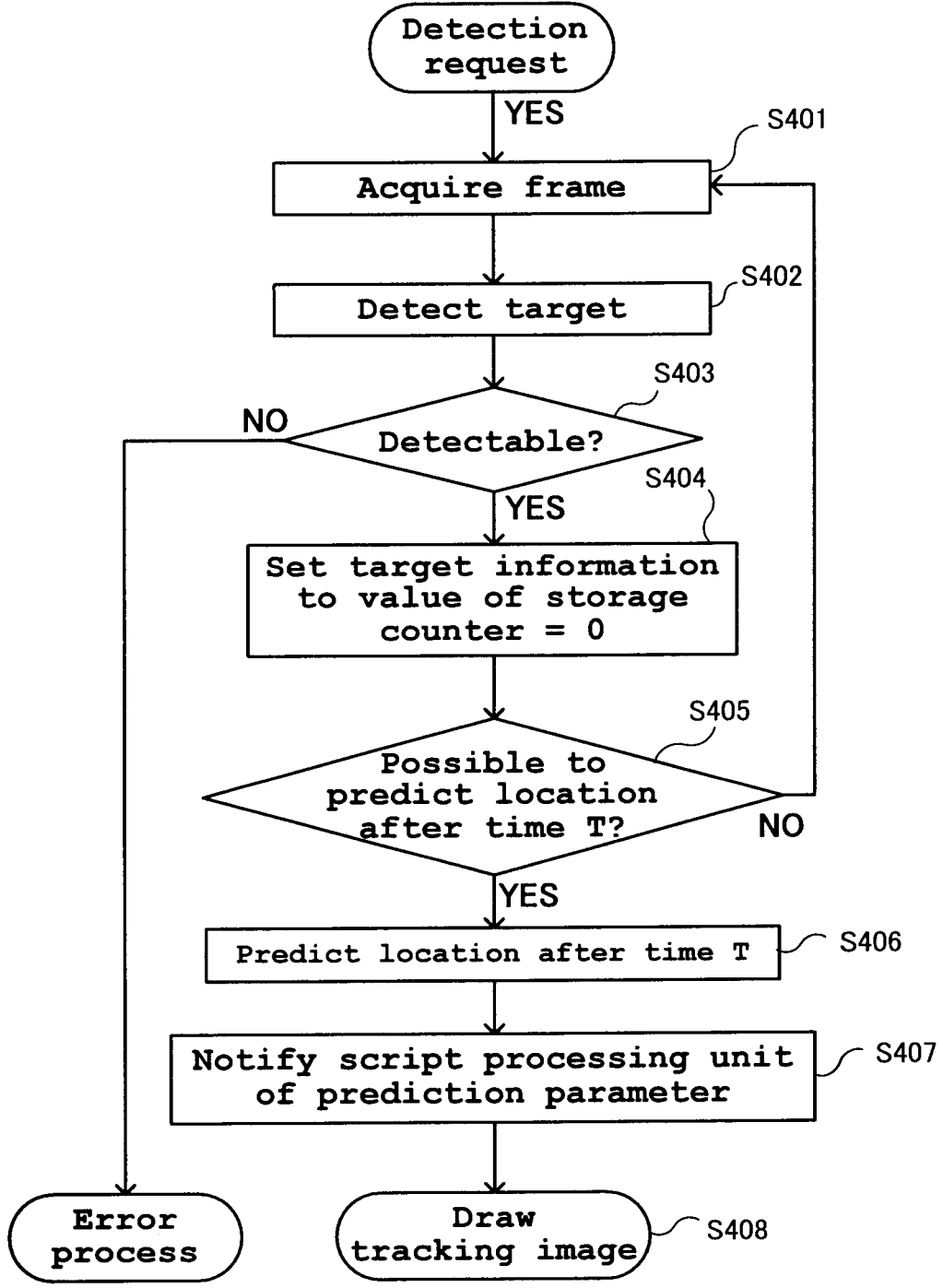
FIG. 9 is a flowchart illustrating an operation of the image processing unit 102 before a target is detected, according to the present embodiment.

FIG. 9 is a flowchart detailing an operation of the image processing unit 102 before the target is detected.

After acquiring an image frame (S401), the detection unit 1021 detects the target (S402). For example, when a to-be-detected object is specified from outside, the detection unit 1021 detects the target using user operation information in which a to-be-detected area is specified by a device, such as a remote control or mouse, on the screen of a user who uses the image display device 100.

After the target is detected (S403 YES), information about the target is stored in the storage unit 10231 (S404). More specifically, the information about the target that is stored in the information storage unit 10231 includes a target ID, location coordinates of the target, template information of the target, and the area of the target. Moreover, the initial value of the counter is set to 0; timeout value 0 and the target ID are stored in the prediction parameter storage unit 10232 in such a way that the timeout value and the target ID are associated with each other. Incidentally, a threshold value of the counter represents the time during which detection is retried after it becomes impossible to follow the target. The detection ends after the value of the counter exceeds the threshold value.

What is predicted is a location that the detected target would reach N frames or T seconds later (after the time T has passed) by moving from the current location.

For example, the following steps are used in predicting the location.

[1] For the initial several frames after the detection, the target is detected in every frame; the attribute information of the detected target is stored in the storage unit 1023 (the loop of S401 to S405 is repeated).

Figure 11:
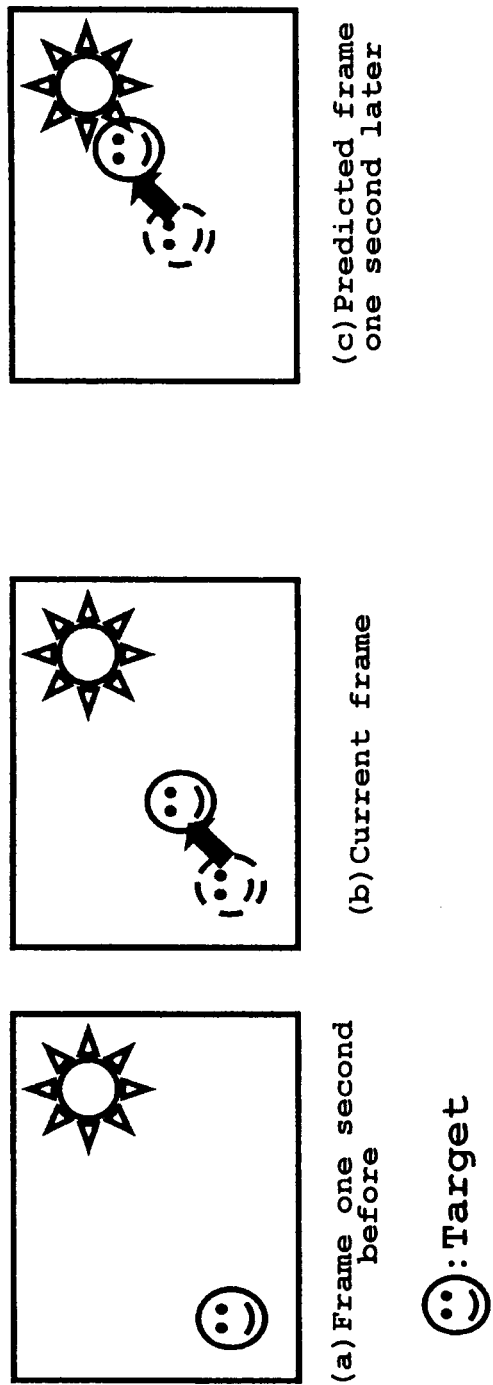
FIGS. 11A to 11C are diagrams showing how the image display device predicts a location, according to the present embodiment.

[2] After the attribute information of several frames is collected (S405 YES), the location prediction unit 1022 uses the attribute information to calculate the prediction parameter for N frames or T seconds later (S406). FIGS. 11A to 11C show an example of how the prediction parameter is calculated with the use of the attribute information. As shown in FIGS. 11A to 11C, for example, based on the location of the target in the current frame (FIG. 11B) and the location of the target in the frame that appears one second before (FIG. 11A), the predicted location of the target one second later is linearly predicted (FIG. 11C). In this manner, what may be used is a method of calculating linearly the predicted location of the prediction parameter.

Incidentally, the method of calculating the predicted location is not limited to the above. For example, the predicted location may be predicted on the basis of the current frame and a plurality of preceding frames. The method of calculating the predicted location of the prediction parameter is not limited to the method of linear calculation.

The calculated prediction parameter is stored in the prediction parameter storage unit 10232 of the storage unit 1023. At the same time, the script processing unit 103 is notified of the calculated prediction parameter (S407). The script processing unit 103 starts drawing the tracking image of the target (S408).

Figure 10:
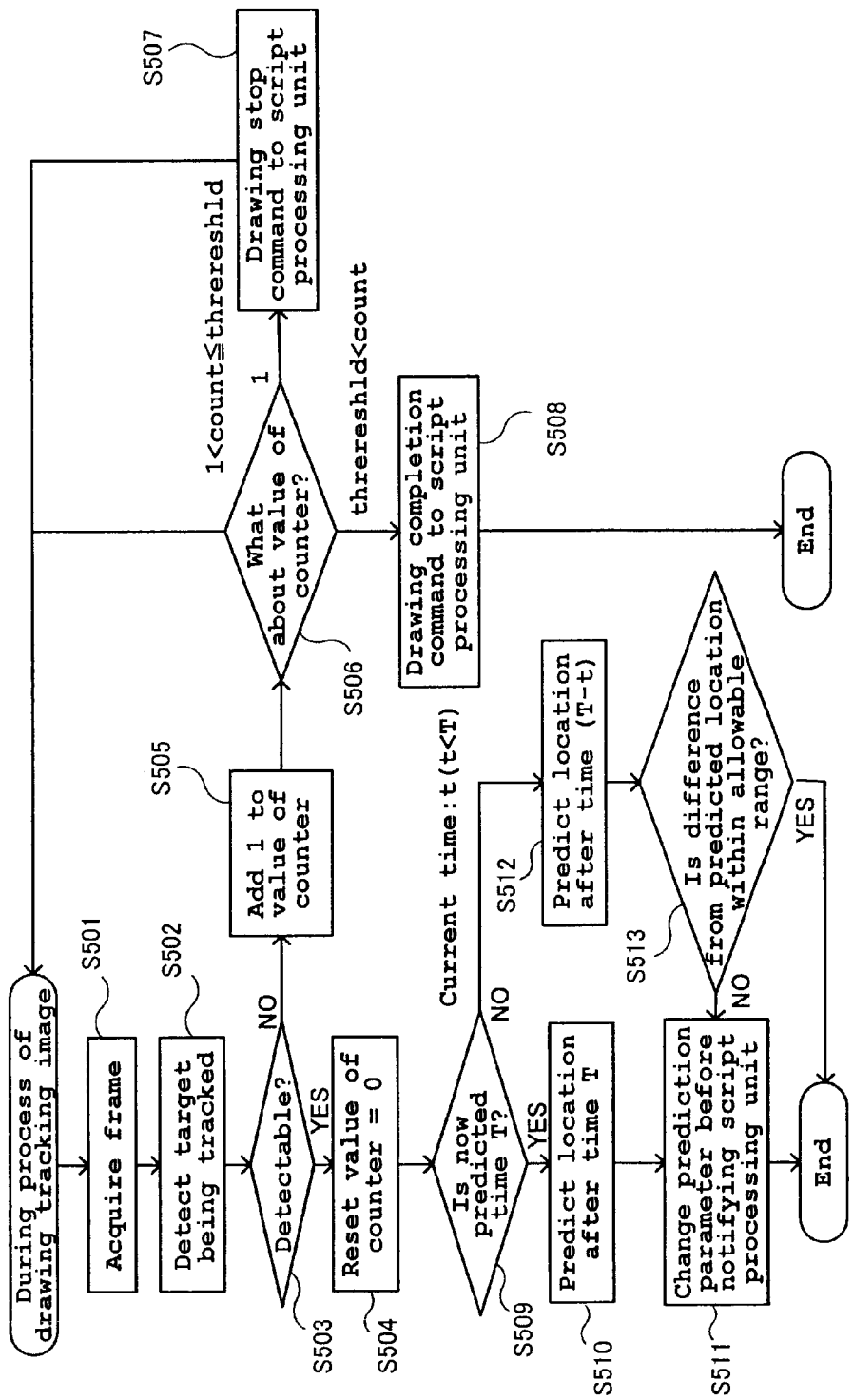
FIG. 10 is a flowchart illustrating an operation of the image processing unit 102 when a target is being tracked, according to the present embodiment.

The following describes in detail a processing operation of the image processing unit 102 when the target is being tracked, particularly a method of ending the drawing of the tracking image after it becomes impossible to track the target, with reference to FIG. 10.

After an image frame is acquired (S501), a target that is currently being tracked is detected from the image frame (S502). When the target is detected (S503 YES), the value of the counter is set to 0 (S504). When the target is not detected (S503 NO), 1 is added to the value of the counter (S505). Then, the value of the counter is checked (S506). When the value of the counter is 1, a drawing stop command is issued to the script processing unit 103 because the target in the current image frame is not detected for the first time (S507). When the value of the counter is greater than 1 and less than or equal to the threshold value, the image processing unit 102 acquires an image frame and detects the target again (S501 and S502). Even when the image processing unit 102 cannot detect the target, there may be the case where the to-be-tracked target is temporarily invisible behind another object in the image frame and other cases, as well as the case where the target can be detected again in the image frame. Accordingly, at step S502, when the value of the counter is less than or equal to the threshold value, the image processing unit 102 detects the target again to track. Meanwhile, when it is not possible to detect the target and the value of the counter exceeds the threshold value, the script processing unit 103 is notified of a drawing completion command as a result of timeout, and the drawing process ends (S508). The threshold value is for example set at 10 seconds.

In response to the drawing completion command, the script processing unit 103 ends the drawing of the tracking image. In the example here, suppose that the image frame acquired by the image display device 100 changes from a previously acquired one to a different scene. In this case, the image frame acquired by the image display device 100 has changed to a different scene. Therefore, the target that has appeared in the preceding scene may not be detected for some time to come. Thus, the process of detecting the target ends.

After the image processing unit 102 checks whether the target is detected, the value of the counter is reset to 0 (S504) when the target is detected (S503 YES). Then, what is checked is the number of frames or time that has passed since the last time the script processing unit 103 is notified of the prediction parameter (S509). When the predicted time (N frames or T seconds) has passed since the script processing unit 103 is notified of the prediction parameter (S509 YES), the location prediction unit 1022 predicts the location again where the target would exist N frames or T seconds later (S510) and notifies the script processing unit 103 of the prediction parameter (S511). When the predicted time (N frames or T seconds) has not passed (S509 NO), the script processing unit 103 continues the drawing process. At this time, in order to compare the predicted location where the target would exist at time T, which is predicted at a previous point in time (time 0), and the predicted location where the target would exist at time T, which can be predicted at the current time t, the image processing unit 102 calculates the predicted location where the target would exist at time T, which is T-t seconds later (S512). Then, the image processing unit 102 checks the difference between the predicted location of time T, which is predicted at a previous point in time (time 0), and the predicted location of time T, which is now calculated (at the current time t) (S513). When the difference is within a predetermined range (S513 YES), the image processing unit 102 does not perform anything anymore and ends the process to wait for the next image frame. When the difference is not within the range (S513 NO), the image processing unit 102 notifies the script processing unit 103 of the prediction parameter that contains the predicted location where the target would exist at time T, which is calculated at step S513 (S511).

As described above, when the target has not been detected for a predetermined period of time or across a predetermined number of successive frames, the process of generating the tracking image comes to an end, thereby preventing only the tracking image from being displayed even when there is no target in the image frame.

Incidentally, the image display device 100 may be realized by using a general-purpose computer device as basic hardware. That is, the following can be realized by a processor that is mounted on the above computer device to execute a program: the acquisition unit 101, the image processing unit 102 (the detection unit 1021, the location prediction unit 1022, and the storage unit 1023 (the information storage unit 10231 and the prediction parameter storage unit 10232)), the script processing unit 103 (the event handler unit 1031 (the drawing event generation unit 10311 and the operation event generation unit 10312), the event processing unit 1032 and the drawing unit 1033), the synthesis unit 104, and the display unit 105. In this case, the image display device 100 may be realized by installing the above program in advance on the computer device, or by installing the program on the computer device appropriately with the above program being distributed through a storage medium, such as CD-ROM, in which the program is stored, or through a network. The storage unit 1023 (the information storage unit 10231 and the prediction parameter storage unit 10232) may be realized by appropriately using a storage medium, such as a memory, hard disk, CD-R, CD-RW, DVD-RAM or DVD-R, which is a built-in or external storage medium of the above computer device, or the like.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form of the methods and systems described herein may be made without departing from the sprit of the inventions. The accompanying claims and their equivalents are intended to cover such forms or modifications as would fall within the scope and spirit of the inventions.

What is claimed is:

1. An image display device that displays acquired image frames, comprising:
    an image processing unit that detects a target in a first image frame among the image frames, generates, based on a result of the detection of the target in the first image frame and a result of a detection of the target in a fourth image frame that has been acquired before the detection of the target in the first image frame, a first prediction parameter containing a first predicted location of the target in a second image frame acquired at a first time when a predetermined number of frames or predetermined period of time has passed since the first image frame is acquired, detects the target in a third image frame acquired at a second time that is between the acquisition of the first image frame and the first time, and generates, based on a result of the detection of the target in the third image frame and a result of a detection of the target in a fifth image frame that has been acquired before the second time, a second prediction parameter containing a second predicted location of the target in the second image frame;
    a script processing unit that generates, based on the first prediction parameter, a first tracking image such that the first tracking image continuously moves over a plurality of frames between the first and second image frames, starting from a starting-point location of the target in the first image frame and heading toward the first predicted location in the second image frame and, when a difference between the second and first predicted locations exceeds a predetermined threshold value, stops generation of the first tracking image and generates a second tracking image such that the second tracking image continuously moves over a plurality of frames between the third and second image frames starting from the location of the target in the third image frame and heading toward the second predicted location in the second image frame;
    a synthesis unit that generates combined images where the first tracking image is put on the plurality of image frames between the first and second image frames and generates combined images where the second tracking image is put on the plurality of image frames between the third and second image frames; and
    a display unit that displays the combined images.

2. The image display device according to claim 1, wherein when the image processing unit cannot detect the target from acquired image frames for a predetermined period of time, the script processing unit ends a process of generating the first and second tracking images.

3. The image display device according to claim 1, wherein the image processing unit generates a prediction parameter that further includes a motion pattern representing how the target moves from the starting-point location to the first predicted location, and
    the script processing unit generates the first tracking image in accordance with the motion pattern.

4. The image display device according to claim 3, wherein the image processing unit generates a prediction parameter that further includes a target ID that is unique to the detected target.

5. An image display method that makes an image display device display acquired image frames, comprising:
    an image processing at which an image processing unit detects a target in a first image frame among the image frames, generates, based on a result of the detection of the target in the first image frame and a result of a detection of the target in a fourth image frame that has been acquired before the detection of the target in the first image frame, a first prediction parameter containing a first predicted location of the target in a second image frame acquired at a first time when a predetermined number of frames or predetermined period of time has passed since the first image frame is acquired, detects the target in a third image frame acquired at a second time that is between the acquisition of the first image frame and the first time, and generates, based on a result of the detection of the target in the third image frame and a result of a detection of the target in a fifth image frame that has been acquired before the second time, a second prediction parameter containing a second predicted location of the target in the second image frame;

a script processing at which a script processing unit generates, based on the first prediction parameter, a first tracking image such that the first tracking image continuously moves over a plurality of frames between the first and second image frames, starting from a starting-point location of the target in the first image frame and heading toward the first predicted location in the second image frame and, when a difference between the second and first predicted locations exceeds a predetermined threshold value, stops generation of the first tracking image and generates a second tracking image such that the second tracking image continuously moves over a plurality of frames between the third and second image frames, starting from the location of the target in the third image frame and heading toward the second predicted location in the second image frame;

a synthesis at which a synthesis unit generates combined images where the first tracking image is put on the plurality of image frames between the first and second image frames and generates combined images where the second tracking image is put on the plurality of image frames between the third and second image frames; and a display at which a display unit displays the combined images.

6. An image display program stored on a non-transitory computer readable medium that causes a computer to function as image display means for displaying acquired image frames on a screen of an image display device and to function as:

image processing means for detecting a target in a first image frame among the image frames generating, based on a result of the detection of the target in the first image frame and a result of a detection of the target in a fourth image frame that has been acquired before the detection of the target in the first image frame, a first prediction parameter containing a first predicted location of the target in a second image frame acquired at a first time when a predetermined number of frames or predetermined period of time has passed since the first image frame is acquired, detecting the target in a third image frame acquired at a second time that is between the acquisition of the first image frame and the first time, and generating, based on a result of the detection of the target in the third image frame and a result of a detection of the target in a fifth image frame that has been acquired before the second time, a second prediction parameter containing a second predicted location of the target in the second image frame;

script processing means for generating, based on the first prediction parameter, a first tracking image such that the first tracking image continuously moves over a plurality of frames between the first and second image frames, starting from a starting-point location of the target in the first image frame and heading toward the first predicted location in the second image frame and, when a difference between the second and first predicted locations exceeds a predetermined threshold value, stopping generation of the first tracking image and generating a second tracking image such that the second tracking image continuously moves over a plurality of frames between the third and second image frames, starting from the location of the target in the third image frame and heading toward the second predicted location in the second image frame;

synthesis means for generating combined images where the first tracking image is put on the plurality of image frames between the first and second image frames and generating combined images where the second tracking image is put on the plurality of image frames between the third and second image frames; and display means for displaying the combined images.

* * * * *